United States Patent

[11] 3,561,575

| | | |
|---|---|---|
| [72] | Inventor | Fernand Stanislas Allinquant<br>53, Avenue Le Notre, 92 Sceaux, France |
| [21] | Appl. No. | 790,250 |
| [22] | Filed | Jan. 10, 1969 |
| [45] | Patented | Feb. 9, 1971 |
| [32] | Priority | Mar. 11, 1968 |
| [33] | | France |
| [31] | | 143,253 |

[54] ADJUSTABLE HYDRAULIC DAMPER
4 Claims, 5 Drawing Figs.

[52] U.S. Cl. .................................................. 188/88, 188/96
[51] Int. Cl. .................................................. F16f 9/44
[50] Field of Search ........................................... 188/88.502, 88.505, 96.2, 96.51

[56] References Cited
FOREIGN PATENTS

| | | | |
|---|---|---|---|
| 120,442 | 10/1945 | Australia .................. | 188/88(.502) |
| 1,249,100 | 8/1967 | Germany .................. | 188/88(.505) |
| 1,260,899 | 2/1968 | Germany .................. | 188/88(.502) |
| 565,630 | 11/1944 | Great Britain............. | 188/88(.502) |

Primary Examiner—George E. A. Halvosa
Attorney—Stevens, Davis, Miller & Mosher

ABSTRACT: This invention relates to a hydraulic damper device in which a piston and piston rod assembly is axially slidable in a cylinder, said piston assembly including passage means controlled by a spring leaf valve to restrict flow of hydraulic fluid through said passage means thereby to afford damping, characterized by the provision of a bent washer of resilient material whose convex surface presses the spring leaf against a front surface of the piston assembly in a region around the piston rod, and a control member engaging a peripheral portion of the bent washer and slidable along the piston rod to adjust the surface area of said region.

PATENTED FEB 9 1971    3,561,575
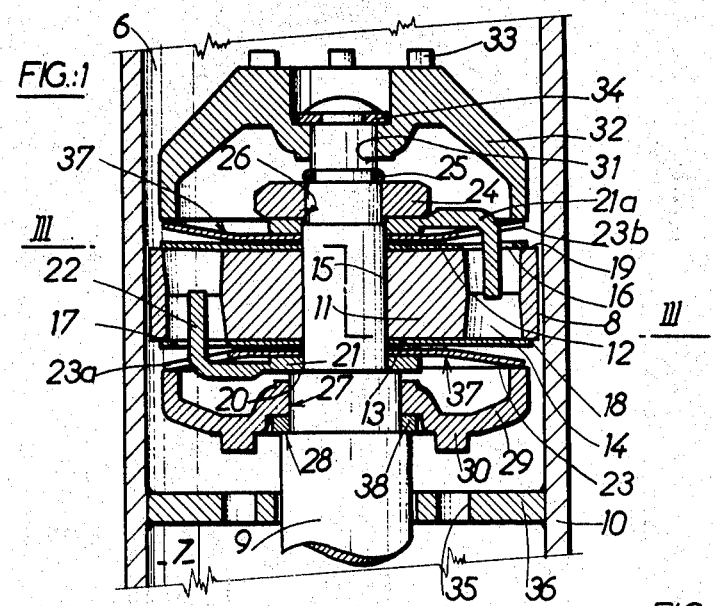
FIG.:1
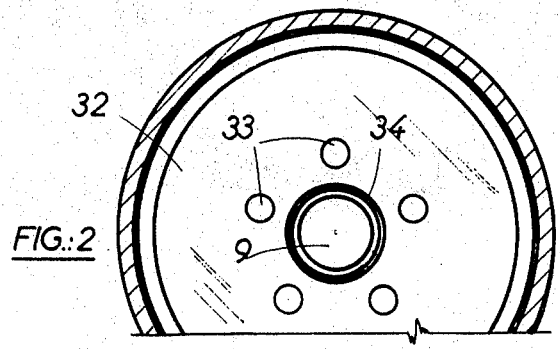
FIG.:2
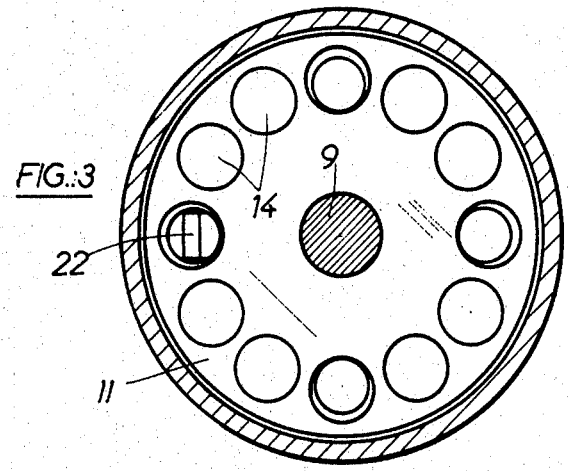
FIG.:3
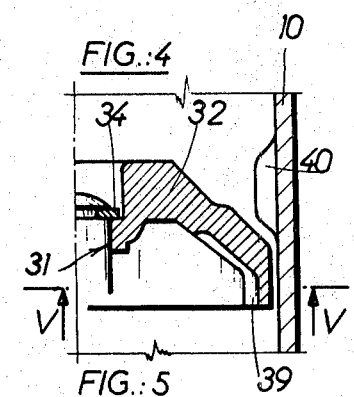
FIG.:4
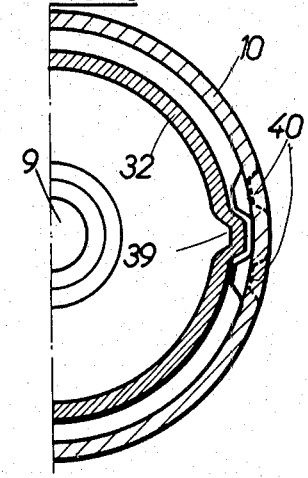
FIG.:5
INVENTOR
FERNAND S. ALLINQUANT
By Stevens, Davis, Miller & Mosher
ATTORNEYS

ADJUSTABLE HYDRAULIC DAMPER

This invention relates to a hydraulic damper.

In these dampers, the displacement of a member called the piston creates fluid flows through calibrated orifices, and the resistances to losses of pressure thus brought about constitute the damping forces.

In telescopic dampers, a rod carries a piston which slides in a closed cylinder filled with fluid, the said cylinder communicating with a reservoir which acts as a compensation chamber for the variations in fluid volumes arising due to displacement of the rod. The said compensation chamber acts at the same time to contain the excess of fluid which tends to escape during the heating up of the latter when employed for damping purposes. The movement of the piston is usually employed to force the fluid to pass through the said piston along contoured passages, losses of pressure being there produced directly, bringing about on the rod the forces that are desired for damping.

It therefore appears that the velocity of flow of the fluid, linked with the velocity of displacement of the piston by a more or less complex natural law, characterizes a range of damping forces.

The comfort in a damped suspension system appears to be provided by the aperiodicity of the system, but it does not seem possible in a given suspension system to reconcile the adjustment of a damper so that this aperiodicity will be brought into being in response to every possible excitation.

It would therefore appear necessary to ensure the possibility of varying the adjustment of the said dampers.

In the pistons of dampers where fluid circulates are provided valve means which may be of various types:
  either plug means of various shapes (spherical, conical and flat), applied against their seats by springs opposed to the fluid pressure;
  or spring discs, flat or prestressed to a camber form, whose elasticity alone ensures that they will be urged against their seats.

Modifying the calibration of the springs provides the desired variation in adjustment, but frequently this adjustment of the valve springs brings with it damping variations throughout the range of frequency of excitation.

The object of the invention is to provide an arrangement which renders it possible to adjust the damping provided by pistons with spring valve means, which adjustment can only take effect for certain frequencies of excitation.

The following description referring to the accompanying drawings, given by way of nonlimitative example, will illustrate how the invention may be put into effect.

In the drawings:

FIG. 1 is a view in longitudinal section of one embodiment of the invention;

FIG. 2 is a view in cross section;

FIG. 3 is a view in cross section taken along the line III-III in FIG. 1, rendering it possible to see details of various elements of the invention;

FIG. 4 is a fractional view in section similar to FIG. 1, showing a modification for embodying the setting motion of the adjustment members; and FIG. 5 is a view in cross section taken along the line V-V in FIG. 4.

In FIG. 1 will be seen the rod 9, which has its end machined and provided with threads of various diameters to receive the elements which make up the damper piston. This "piston" assembly shifts with a predetermined clearance 8 inside a cylinder 10 having a polished interior wall.

The rod 9 is machined at 15 to receive the piston body 11. The said body is made of an antifriction alloy which can be made either by pressure-casting light alloys or by powder metallurgy.

The general form of the said body 11 is a cylindrical member pierced by a certain number of cylindrical passages 14 through which the damping fluid passes. The said passages have port on to the faces of the body 11 by way of orifices closed off by spring discs 12 and 13 acting as valve means. The said discs are centered on the machined part 15 of the rod and are pierced by a certain number of holes 16 or 17 which render it possible for the damping fluid to enter the passages. The said holes 16 and 17 alternate in such a way that for a given passage in the body 11 the orifice on one face is open and the other one is closed.

The said spring valve means 12 and 13 may be cut from metal strips such as hardened steel or bronze alloyed with beryllium.

The faces 18 and 19 of the body 11 are concave so that the valve means 12 and 13 are pressed upon and thus receive a degree of prestressing which will ensure the complete sealing off of the orifices of the passages covered by them.

To obtain this prestressed mounting of the valve means, the rod 9 carries a shoulder 20 against which there rests a thrust-distributing washer 21 carrying a tab 22 bent over in hook fashion and a cambered spring washer or baffle 23 pierced with holes 23a.

On the other face will be found similar pieces 23b and 21a which are held in position by a nut 24 screwed on to a thread 26 provided on the rod. The nut 24 is held fixed by a locknut 25. The hooks 22 on the washers 21 prevent the valve means 12 and 13 from rotating when the nut 24 is screwed home and thus keep the orifices of the passages 14 with correctly plated ports, as also the holes 16 or 17 appertaining to the valve means opposite them.

Between the body of the rod 9 and the machined part 15 there is located threading 27 terminated at one end by the shoulder 20 against which there rests the washer 21 and at the other end by a second shoulder 28 which likewise received a thrust-distributing washer 38. On the threading 27 there is screwed a stamped-out unit 29 of bell shape and one of whose faces bears fingers 30. On the end portion of the rod 9 there is provided further threading 31 on to which is screwed a unit 32 similar to the unit 29 except as regards its dimensions. The maximum displacement of the said unit 32 is limited by the washer 34 shrunk-on at the end of the rod 9. The skirts of the units 29 and 32 press against the curving ends of the baffles 23.

The smaller curve in these baffles 23 is obtained when they are being fabricated and is maintained in assembly when the units 29 and 32 are respectively abutting the shoulder 28 or the washer 34.

The fingers 30 and 33 may engage in ports 35 arranged either in the washers 36 attached to the wall of the tube 10 or in endplates (not shown here) closing off the tube 10.

Operation is therefore as follows: the mechanical combination overall constituted by all the pieces cited hereinbefore and assembled at the end of the rod 9 is called a "piston," and it is this assembly which is subjected to movements inside the tube 10.

During these movements the damping fluid flows from the chamber 6 towards the chamber 7 or in the opposite direction, in the first place via the peripheral clearance 8 between the body 11 and the tube 10, then passing via the passages 14, forcing the valve means 12 or 13, which block the passage orifices, to lift.

According to the velocity of these alternating displacements, the opening of the valve means will be greater or less; opening is, moreover, limited by the pressure of the said spring discs 12 or 13 against the baffles 23.

It is the sum of the forces required for the passing of the fluid in the peripheral duct 8 and under the valve means which constitutes the damping force.

When manipulating the rod 9, it is possible to catch the fingers 30 or 33 within the ports 35, whereupon the rotation of the rod brings about the screwing down of the unit 29 (or of the unit 32) on the threading 27 (or 31). Then the skirted units 29 (or 32) tend to close in on the body of the piston 31 and as a result the skirt of the unit 29 (or of the unit 32) presses on the deformable periphery of the baffle 23 so as to modify its camber. This alteration in curvature has two effects:

first, to shift the line 37 of camber, which increases the area of engagement of the surface of the valve means 12 (or 13) with the baffle and consequently increases its rigidity. The passage section for fluid consequently varies by increasing the conjoint lifting effort, and consequently the damping force;

subsequently, to limit the overall aperture affording passage under the valve means and thus to increase losses of pressure when velocities are higher than those bringing about maximum opening.

The presence of these deformable baffles consequently renders it possible to vary their curvature and thus to correct the initial operating characteristics of the spring valve means. Consequently, in return for an easy manipulation of simple pieces the desired variation of the damping forces is achieved.

It will be apparent that it is possible to effect a variation of the damping forces in a preferred direction by providing only a single deformable baffle and one pressure-applying unit subject to screw action.

Without going beyond the scope of the invention, it is also possible to provide that the movement of the skirted units 29 or 32 can be obtained by making serrations 39 on the skirt mesh with stamped-out indentations 40 on the tube.

In this case the terminal portions of the units 29 or 32 may be flat (the fingers 30 or 33 are then eliminated) and it is possible for them to come to press against rubber stops which act to limit the ends of the stroke.

I claim:

1. A telescopic shock absorber of the kind comprising a cylinder containing hydraulic fluid, a double-ended piston with ports therethrough slidably housed in said cylinder, a piston rod threaded through said piston and fast with it, and flexible disc-shaped valves normally seated against each piston end in port obturating position and liftable therefrom by deflection upon exertion of hydraulic pressure through said piston ports, wherein the improvement comprises two resiliently deformable annular flanges of cambered shape at rest, fitted on said piston rod on opposite sides of said piston beyond said respective valves and having each a central portion firmly pressing a corresponding central portion of the respective valve against the respective piston end to prevent deflection of said valve central portion, said cambered flanges having further each a peripheral portion bent away from the respective piston end and a corresponding peripheral portion of the respective valve to allow deflection of said valve peripheral portion, said flange central portion and said flange peripheral portion being connected to each other through a deflection line about which said valve peripheral portion flexes, and two bell-shaped abutment members independently adjustably positionable on said piston rod on opposite sides of said piston beyond said respective cambered flanges and axially displaceable relatively to said piston rod towards or away from the respective piston ends, said abutment members respectively engaging the peripheral portion of said cambered flanges to flatten out the same and displace said deflection line thereof radially outwards upon said abutment members being driven closer to said piston, whereby lift of said disc shaped valves is correspondingly restrained.

2. Shock absorber as claimed in claim 1, wherein said piston rod comprises threaded portions and said abutment members are screwed thereon, whereby relative rotation of said piston rod and abutment members causes axial displacement of the latter with respect to the former.

3. Shock absorber as claimed in claim 2, further comprising mutually engageable means on said abutment members and on said cylinder to secure the same against relative rotation, whereby rotation of said piston rod causes axial displacement with respect thereto of said abutment members.

4. Shock absorber as claimed in claim 3, wherein said means engage when the slidable piston and rod assembly is in a limiting position in said cylinder.